United States Patent Office 2,980,042
Patented Apr. 18, 1961

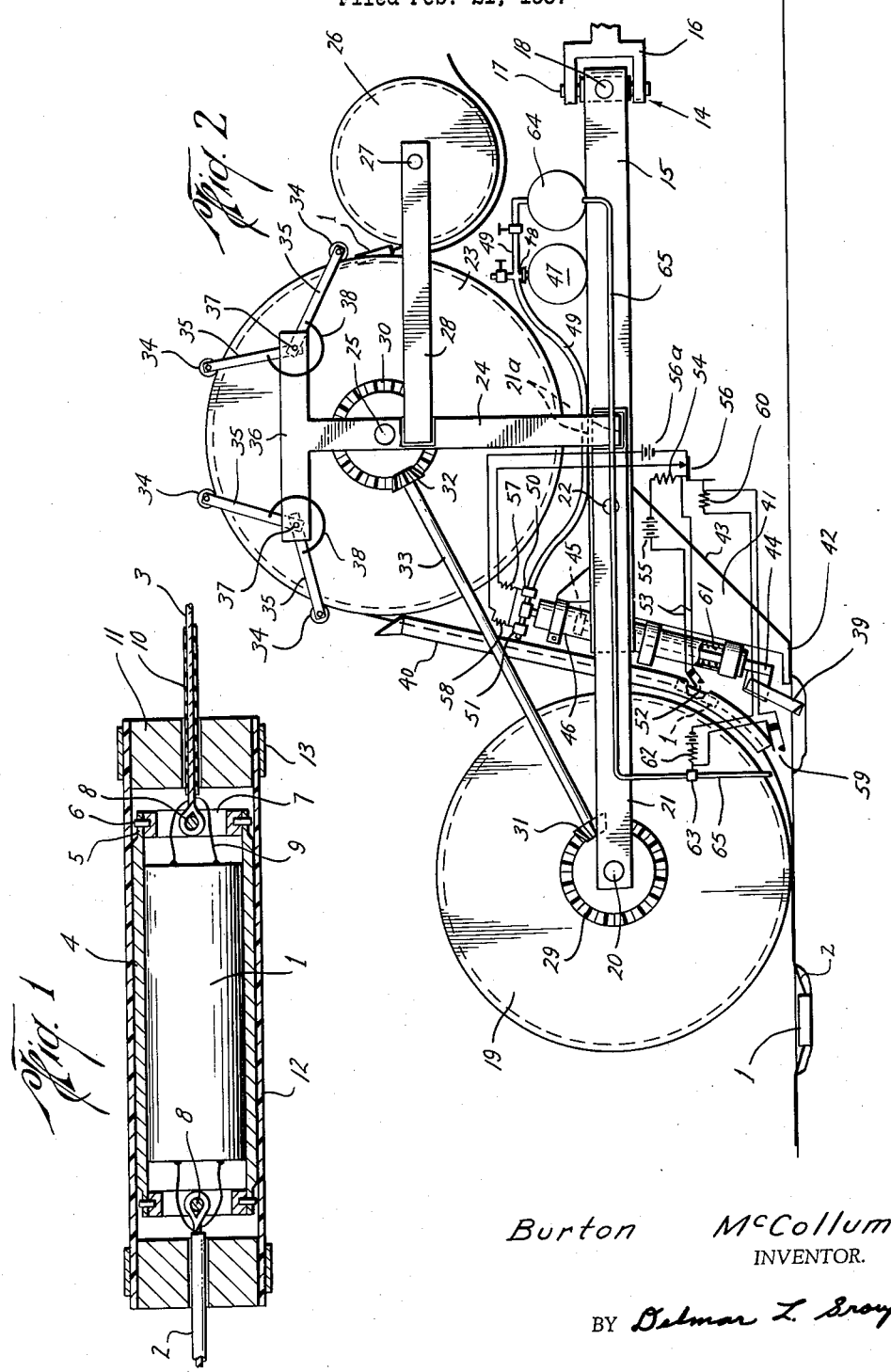

2,980,042
METHOD FOR PLANTING SEISMIC DETECTORS
Burton McCollum, 950 Kirby Drive, Houston 19, Tex.

Filed Feb. 21, 1957, Ser. No. 641,572

6 Claims. (Cl. 111—5)

My invention relates to the art of exploring sub-surface strata by means of the seismograph and, more particularly, to a machine and method for grouping, planting and recovering seismic detectors.

In ordinary commercial seismic exploration the seismic wave is generated at one or more points at or near the earth's surface and, at a spaced point therefrom, the reflected seismic wave is detected and recorded. In many areas soil conditions, sub-surface faults and the like prevent the attainment of satisfactory records by use of a single detector, but by using a plurality of detectors, suitably dispersed, satisfactory records will be obtained. There are vast areas in which a much larger number of detectors must be used to secure satisfactory results, but with conventional methods of putting out or taking up detectors, the time and cost involved in using such a large number of detectors becomes prohibitive.

In some cases a detector may merely be placed on the surface of the earth. However, if there is a substantial amount of wind, a detector so placed is likely to be too noisy. Further, if the surface be soft or pebbly, the coupling or bond with the ground will be poor, giving rise to inefficient detection and, if the detector is permitted to lie on grass or other vegetation, it will become virtually inoperative. It is therefore necessary to place the detectors below all masses of vegetation, such as grass or weeds, and they should preferably be firmly coupled to compacted soil.

To obtain optimum results from a large number of detectors, it is necessary to disperse them over a large area, it being of little benefit to plant a very large number of detectors in a very small area. In this way the horizontally traveling waves, which are usually the cause of poor records, would tend to cancel out each other while the desirable vertically traveling waves will be cumulative in the several detectors. Preferably, the detectors should be dispersed uniformly over a selected area and from 500 to 1000 square feet allotted to each detector. It is obvious that if efficient use is to be made of as many as 500 or 1000 detectors, spacing them with some degree of uniformity, they will have to be placed over an area of several acres. Such use of multiple detector stations is prohibtive under conventional procedures wherein the operator has to walk to and from the individual detector stations and carry the large number of detectors with him. Thus arises the necessity for cheap and rapid machine methods for handling detectors.

It is, therefore, an object of my invention to provide a method whereby a substantial number of detectors can be placed and gathered with maximum facility and speed.

It is a further object of my invention to provide a machine for positioning automatically a substantial number of detectors and conditioning the soil surrounding the detectors for effective reception of seismic waves.

It is a further object of my invention to provide a unitary cable carrier for the seismic detectors that lends itself for use with my method and apparatus and facilitates the rapid placement and gathering of such recorders.

It is a further object of my invention to provide a method and apparatus for the above specified operations that are quick and economical in operation.

In carrying out my invention, I provide a carriage on which is supported a cable having at regular intervals therealong a series of seismic detectors. When moved along the surface of the earth, a plow-like device on my apparatus digs, at intervals corresponding to the spacing of the detectors on the cable, a trench deep enough to contain the detector. The cable is placed along the surface with each detector in a small trench. My machine then covers the trench and compacts the soil to give a firm coupling between the ground and the detector. If necessary, the area of the earth surrounding the detector may be moistened to facilitate the compacting thereof and enhance the bond between the detector and the soil.

Other features and advantages of the invention will appear from the following description taken in connection with the drawings, wherein:

Fig. 1 is a section view of a flexible cable used as a carrier for my seismic detectors; and Fig. 2 is a drawing in perspective of my device for positioning the cable with embedded seismic detectors.

In ordinary commercial seismic exploration, a large number of seismic-wave detectors are spread out in a predetermined pattern to receive independently a seismic wave generated at a specified remote point.

In order to greatly facilitate the handling of the detectors, I prefer to connect a plurality thereof at intervals along a cable as illustrated in Fig. 1, so that the cable serves as a carrier for placing and gathering the detectors. I do not claim as new the broad expedient of placing a plurality of detectors in a cable, it having been employed previously in marine operations. Instead, my invention is directed to certain specific features thereof which contribute to making a cable suitable for land operations.

According to my invention, a large number of detectors 1 are arranged at intervals along a cable 2 as shown generally in Fig. 2. As shown more specifically in Fig. 1 the cable 2 contains a tension member 3, preferably made of some strong elastic material capable of withstanding severe shock. The tension member 3 can be made of steel, but I have found that when reeling in the cable at high speed, it may often hang up or snag on an obstruction and the momentum of the high speed reels will often break the cable. For that reason, I prefer to use a plastic material, such as nylon, possessing a greater elastic extension than steel. This material is very strong, but has an elastic yield many times greater than steel and in the case of the cable becoming snagged while being reeled in, this great elastic yield brings the high speed reel to a gradual stop, thereby avoiding destructive shock.

At each end of the case 4 containing the detector 1 are extensions 5 between which is pivotally connected on vertical pins 6 a metal sleeve 7. The tension member 3 is terminated in a loop which is carried around horizontal pin 8. The pivotal connection between the tension member 3 and the pin 8 and between the sleeve 7 and the extensions 5 are in the nature of a universal joint providing a highly flexible coupling that is particularly well suited to my invention.

A pair of electrical conductors 9 are wound about the tension member 3 in a spiral of small pitch so that stretching of the tension member 3 will not cause any stress or strain on the conductors 9. These wires are connected to the detector 1 to transmit impulses therefrom along the cable 2.

The cable 2 is completed by surrounding the tension member 3 with a plastic waterproof covering 10 which may be of rubber or of a plastic such as neoprene which combines the properties of high elastic yield and high resistance to abrasion. At each end of the detector, a sleeve-like closure 11 having outside dimensions substantially equal to the cross-section of the detector is placed over the covering 10. A plastic sleeve 12 preferably of neoprene covers the detector and closures 11 at opposite ends to completely enclose the detector 1. Inside and outside diameters of the covering 10, the closures 11 and the sleeve 12 are so proportioned that the connections are waterproof. If desired, a tension band 13 can be used to reinforce the joint.

I prefer to mount the cable on a reel carried on a vehicle in order to facilitate the paying out and recovery of the cable without fouling. The vehicle used in handling the cable may take a variety of forms, such as a light truck, a trailer drawn by either an automotive unit or by animals, depending on terrain conditions, or may be of the nature of a tractor similar to those used in farming operations. Under most conditions I prefer to use some kind of trailer and the following description is directed to that type of vehicle.

Referring now to Fig. 2, the schematic assembly of the essential elements of my cable planting device are illustrated. A universal coupling 14 couples the trailer beam 15 to a clevis-like device 16 which is firmly attached to the towing vehicle. This coupling permits free rotation about the vertical pin 17 and about the horizontal pin 18, but does not permit rotation about the axis of the beam 15. The beam 15 will therefore maintain the ground-engaging wheel 19 which is rotatable on axle 20 in beam extension 21, in a vertical plane as it rolls along the ground. Beam extension 21 is pivoted at pin 22 to the main beam 15 to constitute an elongation thereof.

Two limit bars 21a on the top and bottom of beam extension 21 define the limits of relative movement between beam 15 and beam extension 21 about pin 22. Thus it is apparent that ground-engaging wheel 19 mounted on beam extension 21 is free to follow the contours of the ground within reasonable limits without causing a change in position of beam 15.

A feed wheel 23 is supported by the pivoted beam 21 through the medium of vertical post 24 on which it is rotatably mounted at axle 25. A cable 2 having spaced detectors 1 may be wound on a reel 26 rotatable about pin 27 on a rigid arm 28 extending laterally from post 24, the cable 2 being wound from the reel 26 by the feed wheel 23. A preferred form of drive for the feed wheel 23 is through the medium of bevel gears 29 and 30 secured to the faces of wheels 19 and 23, respectively, with rotation of wheel 19 being transmitted to wheel 23 through bevel pinions 31 and 32 mounted on the shaft 33. In the arrangement shown, it will be seen that the wheels 19 and 23 turn in opposite directions at a fixed ratio. It has been found that when the cable has been laid, if there be any tension in the cable, the detectors will be very noisy, and further, such tension tends to pull the detectors loose, thereby breaking the bond between the detectors and ground. For these reasons a taut cable is entirely unusable. I avoid this difficulty by designing the equipment so that the feed wheel 23 drives the cable through the machine somewhat faster than the wheel 19 rolls along the ground. This can be accomplished either by designing the gears 29, 30, 31 and 32 so that the wheel 23 rotates faster than the wheel 19, or by making the diameter of the wheel 23 slightly larger than that of wheel 19. However it may be brought about, my invention embraces the basic principle of always laying the cable so that the sections between detectors will be free from tension. Preferably, both wheels 19 and 23 have a concave rim to assist in maintaining a central position of the detector cable 2 which passes over them. As the cable is wound from the reel 26 and passed over the feed wheel 23, a plurality of rollers 34 rotatably carried on arms 35 pivoted to cross-arm 36 on post 24, are employed to keep the cable 2 pressed against the periphery of the feed wheel 23 so that the cable is fed through at a speed equal to the peripheral speed of this wheel. The arms 35 are pivoted in pairs to a single pivot 37 and held firmly in contact with the cable as it passes over the wheel by means of a spring shown symbolically at 38. As the vehicle moves along the earth, the weight of reel 26, feed wheel 23 and their supports forces the central part of the pivoted beam downwardly to drive a plow-like tool 39 carried thereby into the earth. The tool 39 digs a small trench of suitable width and depth to accommodate the cable 2 with detectors 1. On leaving the wheel 23 the cable 2 passes through a guide tube 40 which lays it in the trench dug by the plow 39. The wheel 19 then runs over the cable 2 and compacts the soil around the detector 1 to give it a firm coupling with the ground.

Beam 15 carries a plate-like member 41 which has a foot 42 adapted to slide over the surface of the ground to serve as a guide and limit the depth to which the plow 39 can dig the trench. The sloping forward edge 43 of the guide 41 is adapted to pivot the central portion of the beams 15 and 21 upwardly to permit the plow to ride up over rocks or other obstructions without injury thereto.

The arrangement described above in its simplest form has been found to function satisfactorily where there is a sufficient moisture in the ground to permit the soil to pack firmly around the detector. When the ground is dry, a modification is desirable to permit wetting each detector as it is laid in the trench. Moreover, it is not desirable, especially on sloping surfaces, to dig a continuous trench because even a small trench on sloping ground will often start a wash that will grow progressively larger after every hard rain. To meet these problems the following novel features have been developed and are incorporated herein as material elements of my invention.

The plow 39 is carried at the lower end of a piston rod 44 on the piston 45 of a pneumatic or hydraulic cylinder 46 mounted at the trailing end of beam 15. The reservoir 47 supplies gas under suitable pressure through the automatic pressure regulator 48 and hose 49 to a valve 50. Valve 50, when open, permits gas to enter the pneumatic cylinder 46 and drive the piston rod 44 downward, thereby forcing the plow into the ground to dig the desired trench in which the detector 1 is to be buried. An exhaust valve 51 is provided to release at the proper time the compressed gas from the cylinder 46.

At a suitable point on the guide 40 there is placed an electrical contacting switch 52 so arranged that when the leading end of the dectector 1 touches the contacting switch it closes the circuit through conductors 53 and energies the relay 54 from the power source, here exemplified by the battery 55. This closes the relay contact 56 and energizes through battery 56a the solenoids 57 and 58 from the power source 55. Of the solenoid operated valves 50 and 51, the former is normally closed and the latter normally open when the solenoids 57 and 58 are not energized and when the solenoids are energized by the relay 54, the situation is reversed. Thus, on energizing the solenoids, the valve 51 is closed and valve 50 is opened to fill the cylinder 46 with compressed gas. The valves 50 and 51 remain in this condition as long as the relay contact 56 is closed. Thus, even though the detector 1 passes out of contact with the switch 52, the piston remains in downward position. Also disposed along the guide tube 40 spaced from contact switch 52 is a second contacting device 59. When the leading end of the detector 1 reaches this point, the contact device 59 simultaneously performs two functions. It energizes the releasing solenoid 60 of the latching relay 54, thereby opening the relay contact 56 and de-energizing the solenoids 57 and 58 to shut off the supply of high pressure gas to the cylinder 46 and to open the exhaust valve 51. A spring 61 mounted inside the cylinder 56 then restores the piston 45 to its top position, thereby withdrawing the plow 39 from the ground. Thus, only a short trench, just sufficient to accommodate the detector 1, is dug by the plow 39. Simultaneous with the release of the gas pressure from the cylinder 46 the closing of contact switch 59 energizes a solenoid 62 to open a valve 63 and permit water to flow from a water tank 64 through the pipe 65 to impinge on the detector 1 just at the time it is being laid in the trench dug by the tool 39. The water will continue to flow as long as the detector 1 is in contact with the switch 59 to provide a sufficient amount of water to facilitate the bonding of the detector to the ground. As soon as the trailing end of the detector passes the switch it automatically opens, thereby de-energizing the solenoid 62 and permitting the valve to resume its normal closed position. A suitable pressure is maintained on the water tank 64 by connecting it to the gas line 49 as shown. As the cable passes down the guide tube 40, it is laid along the ground with each detector 1 being disposed within a trench dug by the plow 39. The wheel 19 then rolls over the ground, its concave rim forcing soil into the trench and compacting the soil around the detector 1 to give it a firm bond with the ground.

While I have thus described my invention in terms of its simple embodiment, it is understood that modifications thereof may be employed to obtain the benefits set forth. The scope of the invention, therefore, should be ascertained only by reference to the following claims.

Having described my invention I claim:

1. In geophysical exploration, the method of planting a plurality of seismic wave detectors comprising the steps of securing said detectors at fixed intervals along a cable to form a longitudinal series thereof, digging a series of trenches in the surface of the ground at intervals slightly shorter than the detector intervals on said cable, laying said cable with each of said detectors in one of said trenches, covering each of said detectors with soil, and compacting said soil around each detector.

2. In geophysical exploration the method of planting seismic wave detectors comprising the steps of securing a series of said detectors, comprising at least a first and second detector, in spaced relation along a cable, winding said cable on a reel, simultaneously moving said reel substantially parallel to the ground along the course on which it is desired to plant the detector series and unwinding said cable to lay it on the ground, digging a first detector trench in the ground when said first detector reaches a predetermined position with respect to said reel, continuing to move said reel and unwind said cable to position said first detector in said first detector trench, covering said first detector with soil, compacting said soil around said first detector, continuing to move said reel and unwind said cable until said second detector reaches a predetermined position with respect to said reel, digging a second detector trench in the ground when said second detector reaches said predetermined position with respect to said reel, continuing to move said reel and unwind said cable to position said second detector in said second detector trench, covering said second detector trench with soil, and compacting said soil around said second detector.

3. The method of claim 2 in which said cable is unwound continuously during the digging, covering, and compacting steps.

4. The method of claim 3 in which the reel is moved along its course at a slower rate than cable is unwound therefrom.

5. In geophysical exploration, the method of planting a plurality of seismic detectors comprising the steps of securing said detectors at fixed intervals along a cable to form a longitudinal series thereof, winding said cable on a reel, trenching the surface of the ground, moving said reel substantially parallel to the ground along the course of the trenching, unwinding cable from said reel and into said trenching at a faster rate than the center of rotation of said reel is moving with respect to said trenching, covering each of said detectors with soil and compacting said soil, around each detector.

6. The method of planting seismic wave detectors in geophysical exploration comprising the steps of securing a plurality of detectors at predetermined intervals along a flexible cable, supporting the cable on a carrier, moving the cable and carrier along the ground to be explored, and paying out the cable at a more rapid rate than the rate of travel of the carrier so as to lay the cable on the ground in a slack condition so as to substantially dampen transmission of sonic vibrations along the cable.

References Cited in the file of this patent

UNITED STATES PATENTS

| | | |
|---|---|---|
| 1,792,855 | McRae | Feb. 17, 1931 |
| 2,118,553 | Garlinger | May 24, 1938 |
| 2,336,206 | Woods | Dec. 7, 1943 |
| 2,514,890 | McLemore | July 11, 1950 |
| 2,654,874 | Press | Oct. 6, 1953 |
| 2,712,124 | Ording | June 28, 1955 |
| 2,738,488 | MacKnight | Mar. 13, 1956 |
| 2,755,879 | Widess | July 24, 1956 |
| 2,788,512 | Howes | Apr. 9, 1957 |
| 2,807,793 | Bayhi | Sept. 24, 1957 |
| 2,924,186 | Landeen | Feb. 9, 1960 |